United States Patent [19]

Martens et al.

[11] Patent Number: 4,589,255
[45] Date of Patent: May 20, 1986

[54] ADAPTIVE TEMPERATURE CONTROL SYSTEM FOR THE SUPPLY OF STEAM TO A STEAM TURBINE

[75] Inventors: Alan Martens, Berwyn; Gerry A. Myers, Swarthmore, both of Pa.

[73] Assignee: Westinghouse Electric Corp., Pittsburgh, Pa.

[21] Appl. No.: 664,643

[22] Filed: Oct. 25, 1984

[51] Int. Cl.⁴ .............................................. F01K 13/02
[52] U.S. Cl. ...................................... 60/646; 60/657; 60/667; 60/664
[58] Field of Search ................ 60/646, 657, 660, 664, 60/665, 667

[56] References Cited

U.S. PATENT DOCUMENTS

| | | | |
|---|---|---|---|
| 3,561,216 | 2/1971 | Moore | 60/646 X |
| 3,774,396 | 11/1973 | Borsi et al. | 60/667 UX |
| 4,418,539 | 12/1983 | Wakamatsu | 60/646 |

Primary Examiner—Allen M. Ostrager
Attorney, Agent, or Firm—C. M. Lorin

[57] ABSTRACT

The invention relates to a combined heat recovery steam generator and steam turbine. An adaptive temperature controller establishes a target temperature for controlling the boiler temperature so that the steam admitted on the boiler follows a constant enthalpy when trying to match temperature of steam and rotor temperature.

2 Claims, 3 Drawing Figures

ADAPTIVE TEMPERATURE CONTROL SYSTEM FOR THE SUPPLY OF STEAM TO A STEAM TURBINE

BACKGROUND OF THE INVENTION

The present invention relates to the supply of steam under conditions of pressure and temperature to a steam turbine.

The admission of steam to a steam turbine raises a problem of matching the temperature of steam with the temperature of the turbine in order to avoid stresses therein, especially in the rotor thereof. At the same time, efficiency of utilization of the steam and of the turbine require that such matching be achieved promptly, thereby to minimize the lag between a cold steam input at the restart and a hot turbine rotor, or between a hot steam input and a cold turbine rotor, and both to minimize rotor stress and plant startup time.

Control system are known which permit to ascertain rotor stresses under start-up and/or under load. Such systems modify the operation of the turbine whenever a critical limit in the rotor stresses is encountered. It is also known to operate a turbine at a maximum level of stress and strain short of the unacceptable limit, thereby to maximize the utilization of steam in the system.

The prior art makes use of temperature measurements effected at various locations, such as where the steam flows, where the rotor is exposed to temperature gradients under the steam, where the true temperature of the rotor manifests itself. Measurements as well as calculations of heat flow have been used to ascertain the extent of heat transferred to the rotor as a function of time. More generally, the prior art has been concerned with establishing the temperature of the rotor at any given time and the state of the steam influencing rotor temperature at any given moment whereby rotor stresses can be and have been calculated, thereby to instantaneously ascertain how close start-up or loading of the turbine is to bring about such rotor stresses and strain as would exceed a predetermined critical level.

More specifically, U.S. Pat. No. 3,558,265 (Berry) discusses the effects of thermal loading on a turbine, the risks of rotor thermal stress and plastic strain which affect the life of the turbine due to rapid gradients of temperature when hot steam is first admitted upon the rotor, the casing and blades, as well as under the turbine dynamics in normal operation after start-up. Present rotor stress is determined as a function of steam temperature within the turbine and steam flow at the inlet of the turbine is controlled in relation to how far the system is from limit stress.

U.S. Pat. No. 3,446,224 (Zwicky) proposes to calculate present surface and bore stress of the rotor from measured steam temperature and rotor speed, thereby to prevent exceeding critical limits of stress.

U.S. Pat. No. 3,928,972 (Osborne) proposes to control the dynamic operation of a steam turbine as a function of heat flow, whereby a process variable is used which is determinative of future stress. Calculated heat flow is compared with a reference heat flow which provides maximum rotor strain without exceeding the limit, whereby the desired changes in the turbine operation are accomplished by the shortest possible sequence, while minimizing the lag between steam temperature changes and turbine temperature changes. This approach insures rapid starting of the turbine and allows rapid load changes without damage to the rotor core and blades of the turbine. The Osborne patent makes use of turbine casing temperature, impulse chamber steam temperature and impulse chamber steam pressure which are sensed and combined for load control. The throttle pressure is detected for the purpose of maintaining constant throttle pressure in the supply of steam to the turbine.

It is known from the aforementioned Zwicky patent to sense with thermocouples temperature of the inner casing as an indication of steam temperature. This is used during start-up, together with an indication of speed to calculate simulated surface and bore stress values to be compared with stress limits. The stress margin so derived is used as a corrective signal when positioning the steam turbine valve.

In the Osborne patent, rotor temperature is indicative of the heat buildup in the turbine. Progression of the heat build-up is controlled by controlling the heat flow, and such progression is determined by the distance, or closeness, to a predetermined limit to be approached as quickly as possible without exceeding it.

The prior art also proposes to control the steam supply to the turbine in order to obtain a controlled gradient of temperature on the rotor of the turbine.

As part of the start-up process for thermal stress protection, as explained in U.S. Pat. No. 4,029,951 (Berry), a heat soak period is established for a period of time while running the turbine at reduced speed. Once the soak time is completed, the turbine is allowed to be accelerated to synchronous speed.

In U.S. Pat. No. 3,928,972 (Osborne), consideration is made of a normal transient condition for start-up or acceleration, according to which the temperature gradient through the rotor is substantially constant and under which the heat transfer coefficient changes with speed in such a way that change of speed causes a heat flow change. A similar transient condition is experienced at steady state, when the turbine load is increased, or decreased, at synchronous speed.

Finally, U.S. Pat. No. 4,005,581 (Aanstad) refers to the prior art approach of modulating the flow of steam to the turbine and distinguishes constant throttle pressure control from sliding pressure control during different portions of the turbine operating load range. In contrast, in the Aanstad patent, an operating representation is generated as a function of the turbine steam state to control steam flow. More specifically, such representation is the steam enthalpy derived on the basis of steam pressure and temperature, respectively, at the inlet and exhaust of the turbine stages. While so doing, the enthalpy drop due to steam expansion through the turbine is the parameter used for modulating steam flow.

SUMMARY OF THE INVENTION

The present invention resides in minimizing stresses on the rotor of a turbine, while maximizing the utilization of steam by the turbine, by controlling the quality of steam supplied to the turbine, specifically, by controlling the temperature of generated steam.

The invention also resides, as part of a combined-cycle steam generator-turbine power installation, in controlling the steam generator independently from turbine control so as to bring to temperature the inlet steam in a controlled fashion, thereby to match the temperature of the body of the turbine with steam temperature as quickly as possible without inducing excessive stress or thermal strain in the turbines.

This is achieved by adaptive control wherein steam temperature is increased at a rate defined by a ramping set point.

The invention also provides, following start-up, for a soaking period for the turbine before acceleration to synchronous speed, the steam generator being controlled so as to provide constant enthalpy, thereby to allow pressure and temperature increase of the steam on the side of the steam turbine without altering heat transfer to the turbine rotor while soaking. The turbine is, then, accelerated to synchronous speed, the breaker is closed for loading, whereafter a target temperature is assigned to the steam generator to be reached under adaptive control at a predetermined rate, whereby the turbine rotor reaches operational temperature without undue stress and thermal strain.

DESCRIPTION OF THE PREFERRED EMBODIMENT

Figure 1:
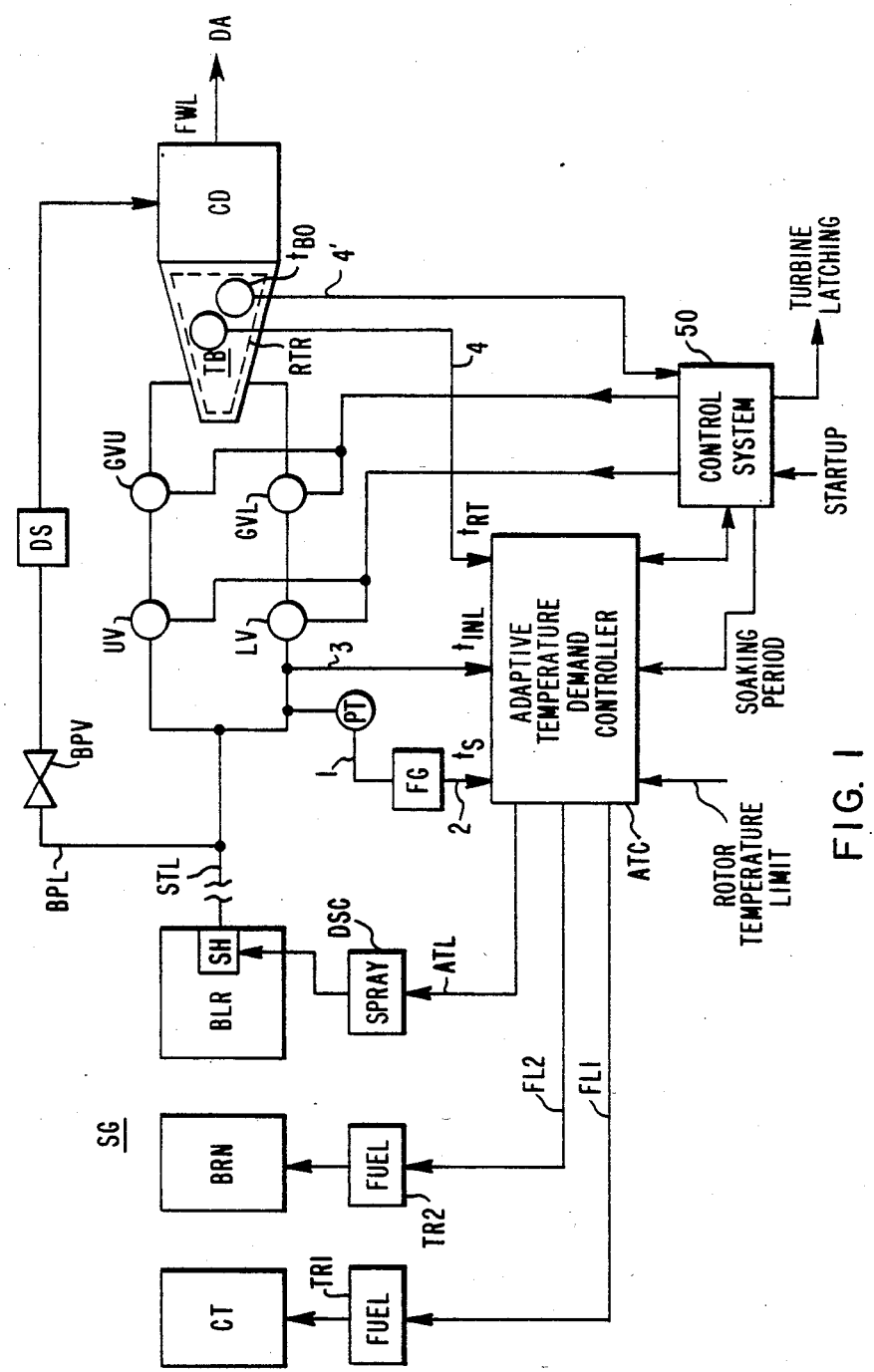
FIG. 1 is a block diagram of a combined-cycle steam generator-power plant embodying the adaptive temperature demand controller according to the present invention.

Referring to FIG. 1, a combined-cycle steam turbine power plant is shown to include a combustion turbine CT and an after-burner AB controlled by respective control lines FL1, FL2 from the adaptive temperature demand controller ATC of the present invention. A boiler BLR which is temperature controlled from attemperator control line ATL, while collecting heat from the combustion turbine CT and the after-burner (AB) exhaust to generate steam from its superheater SH. The generated steam is supplied to a steam turbine TB. From the condenser CD, feedwater is circulated by line FWL back to the deaerator DA of the boiler. The feedwater is converted to superheated steam at a pressure and temperature level determined by the operation of the heat recovery steam generator HRSG. The superheated steam is supplied to the turbine via supply line STL. After startup, the flow of steam, or demand upon the steam generator HRSG, is regulated by the control system 50 operating on the throttle valves and governor valves (UV, GVU on the upper side of the turbine, LV, GVL on the lower side of the turbine) which control the admission of steam to the turbine. To reduce the admission of steam to the turbine part of the steam may be bypassed from line STL to the condenser, via a bypass line BPL including a bypass valve BPV and a desuperheater DS. A combined-cycle steam turbine power plant is disclosed in detail in U.S. Pat. No. 3,965,675 of L. F. Martz et al. For the purpose of this description, the Martz patent is hereby incorporated by reference. The present invention involves the adaptive temperature demand controller ATC of FIG. 1 and its operation in conjunction with the steam generator HRSG and the steam turbine TB, as will be explained hereinafter.

The present invention involves outputting steam from the steam generator HRSG under a controlled temperature prescribed by the adaptive temperature demand controller ATC in relation to the temperature $t_{RT}$ of the rotor RTR of the turbine (derived on line 4 from the high pressure section of the turbine whereas an indication is derived on line 4 of the rotor temperature in the low pressure section and passed to the control system 50), the temperature $t_{INL}$ of steam at the inlet of the throttle valve (the lower valve LV in this instance) derived on line 3, and a control signal (derived on line 2) which represents the temperature of steam required for constant enthalpy under a present pressure. Such required temperature is obtained by conversion, through a function generator FG, of the pressure of steam (derived on line 1) at the input of the admission valves of the turbine.

As well known, the operation of a steam generator like the one of FIG. 1 depends upon the operation of the attemperator as well as upon the firing of the combustion turbine or gas turbine, and the firing of the afterburner. Controlling the flow and operative conditions of the various units heating feedwater and assisting in producing superheated steam for line STL will also affect pressure and temperature of steam at the outlet. A conventional way of changing temperature of the outputted steam is to control the attemperator valves which regulate the spray of cold water on the superheater SH to desuperheat the generated steam. Controller ATC effectuates this via line ATL and desuperheat controller DSC.

The choice of control by lines FL1, FL2, ATL separately or concurrently, is up to the man skilled in the art, once the adaptive temperature demand conroller ATC has established a set-point for temperature regulation. For the purpose of illustration on FIG. 1, three temperature regulators TR1, TR2 and DSC are schematically represented on lines FL1, FL2 and ATL, respectively; the set point being selectively provided on the respective lines by circuit ATC, as explained hereinafter. For the purpose of illustrating temperature control by circuit ATC reference should be had to concurrently filed copending patent application Ser. No. 664,644, which is hereby incorporated by reference.

The present invention involves more specifically the start-up of the steam turbine. When there is a demand for steam from the steam generator, the rotor of the turbine upon restart may be hot, or even very hot, relative to the generated steam, which may be cold, and even very cold at the start. Conversely, the steam may be hot steam when the rotor upon startup is relatively cold, or even quite cold. It is an object of the adaptive temperature demand controller ATC, according to the present invention, to assist in matching steam temperature and rotor temperature in the quickest way, and for the rotor in the safest way possible with minimum constraints of steam generator operation when called to satisfy the demand, e.g., until the turbine can be synchronized at normal speed, the breaker closed and the turbine loaded.

At this stage, it is observed that three different start-up procedures may be followed in bringing the steam turbine up to full operation and the body of the steam turbine and generated steam to matching temperatures, while avoiding rotor stresses and thermal strain.

The first situation is when the rotor is hot. The rotor is, for instance, at 800° F., as ascertained on line 4 from the temperature sensor in the rotor RTR. In such case, the adaptive temperature controller ATC will control the boiler so as to bring heat as quickly as possible, not to put cold steam on the gland valve, nor on the rotor of the turbine. Accordingly, controller ATC will establish a target of, typically 830°, or 30° F. above the actual rotor temperature $t_{RT}$ of 800° F. Having so conditioned to be the outputted steam from the steam generator, e.g., on line STL, the steam generator will be caused to increase the steam temperature up to the maximum absolute temperature allowable on the turbine, as the rotor temperature increases, say to 952° F., through a ramp, typically of 7¼° F. per minute. This ramp will occur after the turbine has been synchronized. Such time progression is determined by the manufacturer of the turbine taking into account the cycle life time at such repeated temperature rate, it being understood that at a higher rate, the number of cycles experienced by the turbine is reduced, while it is increased at a lower rate, an intermediate rate of say 7¼° F. per minute chosen as representing the shortest time reasonable in the compromise for maximizing both the temperature rate and the turbine life time. Another limitation results from the steam generator itself, which may not be able to accommodate a high flow requirement at a given relatively high temperature.

The illustratively given rate of 7¼° F. per minute accounts for a particular geometry, and mass of the rotor.

After the turbine has been accelerated to synchronous speed, then synchronized, and the breaker is closed, the turbine being ready for load operation, ramping at the illustrated rate of 7¼° F. per minute is effected to the operational temperature typically of 950° F. for the turbine. Typically, this takes 31 minutes. The procedure for a hot start can be illustrated by the following series of steps:

perature a soaking period is established. Soaking of a turbine is known in the art. See for instance, U.S. Pat. No. 4,029,951 (Berry). The prior art establish a soaking period during which steam temperature, is maintained constant while running the rotor at constant speed, thereby to allow time for the transfer of heat throughout the mass of the rotor, before being able to go up in temperature and speed to normal operation and loading of the turbine. In contrast, the present invention provides for a supply of steam to the rotor under constant enthalpy so as to run the turbine at soaking speed while maintaining constant heat transfer to the turbine. In particular, such requirement is maintained throughout the soaking period whatever the steam pressure condition at the inlet of the steam turbine.

In other words, it is possible to maintain constant heat on the turbine without temperature and/or pressure limitations as in the prior art approach to soaking. Thus, the desired temperature for steam will be controlled to vary within limits under the constant enthalpy prescribed by the function generator FG of FIG. 1 as applied on line 2, while allowing pressure to fluctuate under steam generator operation, such pressure being detected on line 1 at the input of function generator FG, as can be seen from the well known Mollier diagram. See, for instance, Energy Technology Handbook/Douglas M. Considine—McGraw Hill Book Co., 9–31 FIG. 7. Also, see the steam tables in Keenan and Keyes "Thermodynamic Properties of Steam" published by the American Society of Mechanical Engineers, and the steam table programs for digital computers in "Formulations of Iterative Procedure for the Calculation of the Properties of Steam" by R. D. McClintock and G. J. Silvestri; published by the American Society of Mechanical Engineers in 1968—Library of Congress Card No. 68-22683. Typically, for a steam turbine the level of

| | HOT START STEPS HP ROTOR METAL TEMPERATURE 550° F. OR GREATER LP ROTOR BORE METAL TEMPERATURE 200° F. OR GREATER | | | |
|---|---|---|---|---|
| | THROTTLE | | | |
| STEPS | TEMP °F. | PRESS. PSIA | SPEED RPM | TIME |
| 1. ESTABLISH A CONDENSER VACUUM OF 2.5 IN. HgA OR AS CLOSE AS POSSIBLE AND RAMP THROTTLE STEAM TEMPERATURE | Ramp to 700* | 300 | 2 | 13.5 Min. |
| 2. ACCELERATE TURBINE | 700 | 300 | Roll to 600 | 2 Min. @ 300 RPM/MIN |
| 3. CHECK INSTRUMENTS | 700 | 300 | 600 | |
| 4. ACCELERATE TURBINE | 700 | 300 | Roll to 1200 | 1 Min. @ 600 RPM/MIN |
| 5. ACCELERATE TURBINE | 700 | 300 | 3300 | 3 Min. @ 700 RPM/MIN |
| 6. ACCELERATE TURBINE | 700 | 300 | 3600 | 0.5 Min. @ 600 RPM/MIN |
| 7. SYNCHRONIZE AND ADD 10% LOAD | 732 (or rotor temp. +30° F.) | 300 | 3600 | Hold for 5 Min. |
| 8. LOAD CONTROL TEMPERATURE RAMP 7.25° F./MINUTE | Ramp to 952 | Ramp to 1222 | 3600 | 31 Min. |

*Stands for steam temperature to provide 1370 BTU/pound steam enthalpy, i.e., 700° F. for 300 psia, 770° F. for 800 psia. It is required that the steam temperature be the greater between such referenced steam temperature and the rotor temperature plus 30° F.

A second situation is where the rotor is "warm". In such case, a temperature of at least 200° F. exists at the low pressure (LP) end of the rotor. If this temperature condition is realized, it is possible to accelerate the turbine from zero up to a lesser speed than synchronous speed, typically 2500 RPM, at which intermediate temperature enthalpy just necessary to run the turbine under the admission of steam by the throttle and governor valves is 1370 BTU/lb. which corresponds to about 700° F. to 770° F. when the pressure varies from 300 psig to 800 psig. This is the response characteristic given to function generator FG, then, responding to a pressure input on line 1 varying in the aforementioned pressure range and which generates on lines 2 a controlling signal representing required temperature and varying in the aforementioned temperature range. It appears that all the steam needed for expansion of steam through the turbine is provided and that such enthalpy drop is maintained constant by the adaptive temperature demand controller ATC while the steam is transferring heat to the mass of the rotor. At the end of the soaking period, the temperature should be even throughout. Constant enthalpy control will allow a degree of freedom in the operation of the gas turbine of the steam generator, and provide automatic compensation for fluctuations at the boiler side. Also, the thermal conditions under steam being exactly controlled, the heating requirements of the rotor during soaking can be more strictly observed and the start-up time is reduced.

When the soaking period is over, the turbine is accelerated to high speed, from 2500 RPM to 3600 RPM in the illustration. At the end of such speed ramping step, the turbine is synchronized, the breaker is closed and loading controls are in effect under the control system 50. Then, the adaptive temperature demand controller ATC ramps the temperature of the steam through the boiler to maximum value, of 952° F. typically, under a constant gradient of 7¼° F. per minute in the example given earlier.

The procedure for a warm start can be illustrated by the following series of steps:

WARM START STEPS
HP ROTOR METAL TEMPERATURE LESS THAN 550° F.
LP ROTOR BORE METAL TEMPERATURE 200° F. OR GREATER

| INSTRUCTIONS | THROTTLE TEMP °F. | PRESS. PSIA | SPEED RPM | TIME |
|---|---|---|---|---|
| 1. COLD STAND-BY | Ambient | 0 | 0 | |
| 2. TURNING GEAR | Ambient | 0 | 2 | |
| 3. TURN GLAND SEALING STEAM ON | 518 | 300 | 2 | |
| 4. ESTABLISH VACUUM OF 3.5 to 4.5 IN. HgA | 518 | 300 | 2 | |
| 5. RAMP THROTTLE STEAM TEMPERATURE | Ramp to 700* | 300 | 2 | |
| 6. ACCELERATE TURBINE | 700 | 300 | Roll to 600 | 2 Min. @ 300 RPM/MIN |
| 7. CHECK INSTRUMENTS | 700 | 300 | 600 | |
| 8. ACCELERATE TURBINE | 700 | 300 | Roll to 2500 | 4.75 Min. @ 400 RPM/MIN |
| 9. WARM ROTOR (UNDER A CONSTANT ENTHALPY OF 1370 BTU/lb.) | 700 | 300 | 2500 | 0 to 103 Min. |
| 10. INCREASE VACUUM TO NORMAL (2.5 IN. HgA) | | | | |
| 10.1 ACCELERATE TURBINE | 700 | 300 | Roll to 3600 | 2.75 Min. @ 400 RPM/MIN |
| 11. SYNCHRONIZE AND ADD 10% LOAD | 732 | 300 | 3600 | Hold for 5 Min. |
| 12. LOAD CONTROL TEMPERATURE RAMP 7.25° F./MIN | Ramp to 950 | Ramp to 1222 | 3600 | 31 Min. |

*Steam temperature to provide 1370 BTU/pound steam enthalpy, i.e., 700° F. for 300 psia; 770° F. for 800 psia.

The third situation for the turbine start-up is when the turbine is cold. It is so when at the low pressure LP end of the turbine the rotor temperature is less than 200° F. Below this temperature the metal of the rotor is in a brittle state. Rotation at synchronous speed would cause cracks in the rotor. Therefore, the start-up procedure is modified. First, the steam is caused to reach 600° F. and 300 psi as an operator input target before being passed through the turbine. Then, the rotor is rotated at 600 RPM to create an even transfer of heat from actual steam at such temperature and pressure. The next step is to ramp the temperature of steam rather quickly up to 700° F. while running the turbine at 1000 RPM and hold for over 25 minutes. Thereafter, there is an acceleration step taken to 2500 RPM. Soaking is the next step performed at constant enthalpy by circuit ATC, typically at 1370 BTU/lb. After the soaking period has elapsed, the turbine is brought to full speed, synchronized and loaded with the breaker closed. Typically, the ATC controller ramps temperature breaker closure to the maximum value of 952° F. at a rate, typically, of 7¼° F. per minute.

COLD START STEPS
LP ROTOR BORE METAL TEMPERATURE LESS THAN 200° F.

| INSTRUCTIONS | THROTTLE TEMP °F. | MIN PRESS. PSIA | SPEED RPM | TIME |
|---|---|---|---|---|
| 1. COLD STAND-BY | Ambient | 0 | 0 | |
| 2. TURNING GEAR | Ambient | 0 | 2 | |
| 3. TURN GLAND SEALING STEAM ON | 600 | 300 | 2 | |
| 4. ESTABLISH VACUUM OF 3.5 to 4.5 IN. HgA | 600 | 300 | 2 | |
| 5. RAMP THROTTLE STEAM | Ramp to | 300 | 2 | |

-continued
COLD START STEPS
LP ROTOR BORE METAL TEMPERATURE LESS THAN 200° F.

| INSTRUCTIONS | THROTTLE TEMP °F. | MIN PRESS. PSIA | SPEED RPM | TIME |
|---|---|---|---|---|
| TEMPERATURE | 600° F. or 100° F. Superheat | | | |
| 6. ACCELERATE TURBINE | 600 | 300 | Roll to 600 | 2 Min. @ 300 RPM/MIN |
| 7. CHECK INSTRUMENTS | 600 | 300 | 600 | |
| 8. ACCELERATE TURBINE | 600 | 300 | Roll to 1000 | 1 Min. @ 400 RPM/MIN |
| 9. HOLD | 600 | 300 | 1000 | 5 Min. |
| 10. RAMP THROTTLE STEAM TEMPERATURE | Ramp to 700* | 300 | 1000 | 15 Min. |
| 11. HOLD | 700 | 300 | 1000 | 25 Min. |
| 12. ACCELERATE TURBINE | 700 | 300 | Roll to 2500 | 3.75 Min. @ 400 RPM/MIN |
| 13. WARM ROTOR (UNDER A CONSTANT ENTHALPY OF 1370 BTU/lb.) | 700 | 300 | 2500 | 7.5 to 11 Hrs. |
| 14. INCREASE VACUUM TO NORMAL (2.5 IN. HgA) | | | | |
| 14.1 ACCELERATE TURBINE | 700 | 300 | Roll to 3600 | 2.75 Min. @ 400 RPM/MIN |
| 15. SYNCHRONIZE AND ADD 10% LOAD | 732 | 300 | 3600 | Hold for 5 Min. |
| 16. LOAD CONTROL TEMPERATURE RAMP 7.25° F./MIN | Ramp to 950 | Ramp to 1222 | 3600 | 31 Min. |

*Steam temperature to be that to provide a 1370 BTU/pound steam enthalpy, i.e., 700° F. for 300 psia, 770° F. for 800 psia.

Consideration has been given to a hot start and to a cold start of the turbine as illustrated in U.S. Pat. No. 4,029,951 (Berry).

Figure 3:
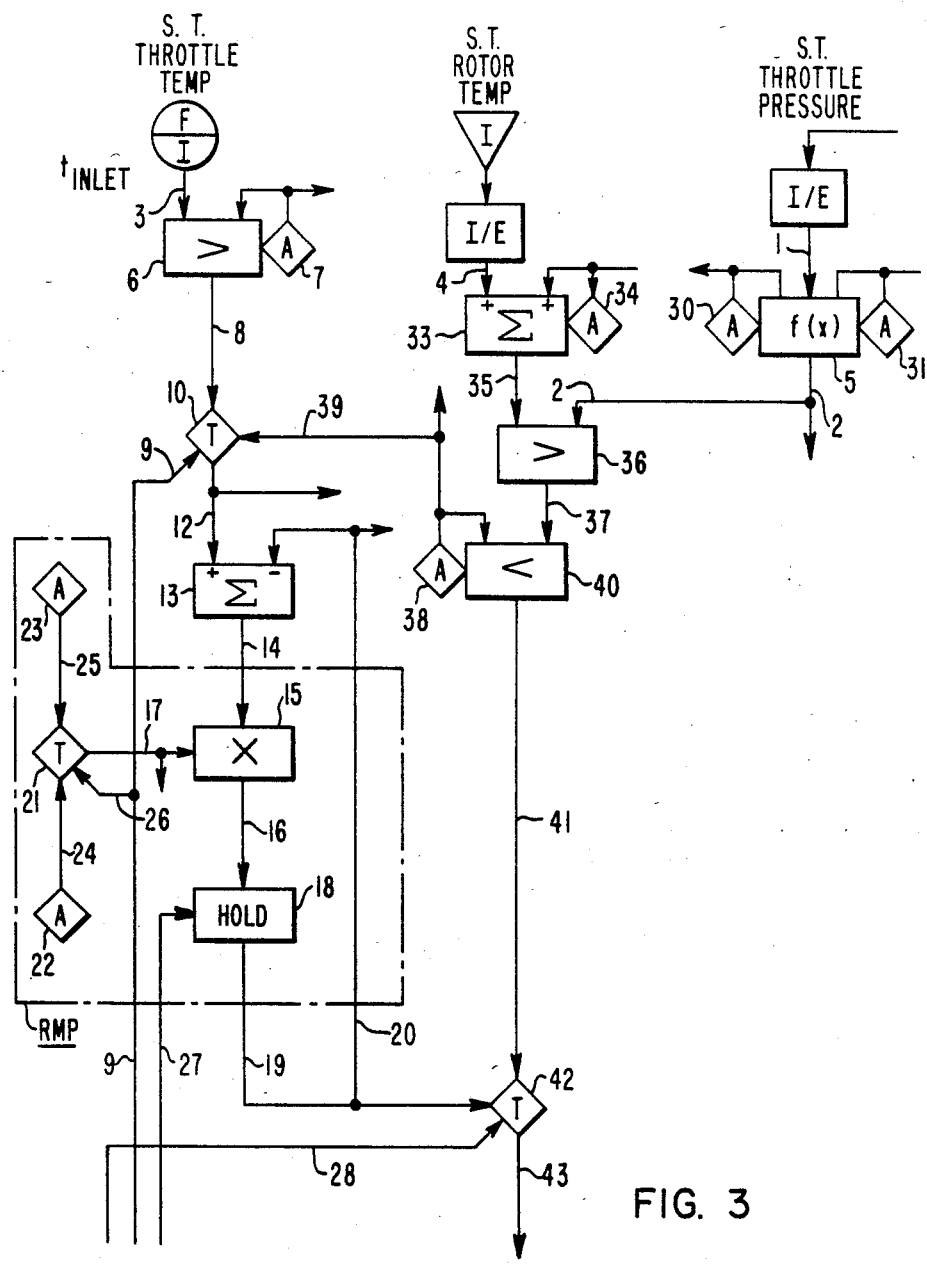
FIG. 3 is electrical circuitry illustrating the implementation of an adaptive temperature demand controller according to the present invention.

Referring to FIG. 3, the adaptive temperature demand controller according to the invention, will now be described illustratively.

Steam temperature $t_{INL}$ derived on line 3 from the inlet of the throttle valve of the turbine is inputted, together with a signal derived on line 7 representing a set point for a temperature of 730° F., into a high select circuit 6. Therefore, on line 8 at the output of circuit 6, a signal is present which is the larger of the two, thus, a temperature representative signal of at least 730° F. is applied on line 8.

Figure 2:
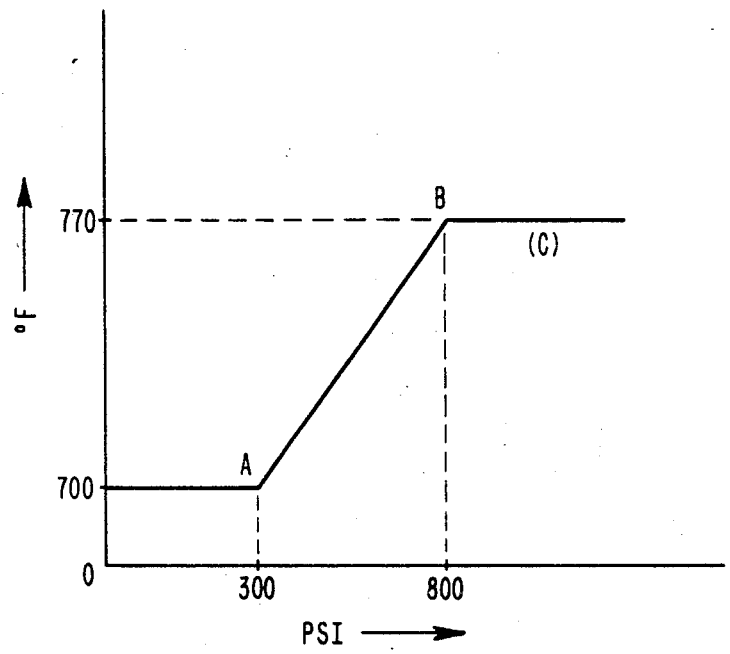
FIG. 2 is a curve characterizing the operation of the constant enthalpy generator associated with the demand controller of FIG. 1.

On line 4 is derived from the HP rotor section a representation of actual rotor temperature $t_{RT}$. A bias of 30° F. is applied from line 34 and added by summer 33 to the rotor temperature signal of line 4. Therefore, on line 35 is present a signal representing $t_{RT}+30°$ F. On line 1, a signal representative of steam pressure in steam supply line STL is derived from a pressure transducer at the inlet of the throttle valve. A function generator 5 (FG in FIG. 1) converts the signal of line 1 into a temperature representative signal as illustrated by FIG. 2. Curve (c) of FIG. 2 shows a linear portion AB extending between 300 and 800 psi on the abscissa axis and between 700° and 770° F. on the ordinate axis. Temperature 700° F. is the lower limit for pressure below 300 psi and 770° F. is the higher limit for pressures above 800 psi. Accordingly, function generator FG will generate on line 2 a temperature representative signal of not less than 700° F. and not more than 770° F. as the assigned temperature for the steam generator, the constant enthalpy condition being satisfied from A to B by increasing linearly the target temperature above 700° F. when pressure increases above 300 psi. Portion AB of curve (c) is in accordance with the Mollier diagram for 1370 BTU/lbs. Thus, from line 30 a minimum temperature of 700° F. is established, while from line 31 a maximum temperature of 770° F., is established. For any value of the steam pressure sensed from line 1 between 300 psi up to 800 psi the signal of line 2 at the output will be increasing from a minimum of 700° F. to a maximum of 770° F. linearly. Such temperature signal of line 2 is applied together with the signal of line 35 to a high select circuit 36. Therefore, on line 37 appears a representation of at least 700° F. or depending upon the steam pressure of line 1, at least a temperature between 700° F. and 770° F., or any value larger than these, when it is the case on line 35 for the rotor temperature.

The output from high select circuit 36, on line 37, is applied to a low select circuit 40 together with a signal from line 38 representing 952° F., Therefore, the lower of the two signals of lines 37 and 38 is applied on line 41, thus, less than 952° F. but not more.

The signals of lines 8 and 41 are applied as input to a switch 10 for line 8, to a switch 42 for line 41, whenever such switch is in the position YES shown as Y in FIG. 3. These switches have a second input valid when the position is NO, shown as N in FIG. 3. These two-position switches are controlled from lines 9 and 28, respectively, to be in the Y-position when the power breaker of the turbine system is open, in the N position when the breaker is closed.

At start-up, e.g., when the breaker is open, the valid input to switch 10 is from line 8, and the valid input to switch 42 is from line 41. If there is a hot start, $t_{RT}$ being for instance 800° F., the signal of lines 4 and 35 prevail over the signal of line 2, and the signal of line 37 prevails over the 952° F. signal of line 38. Therefore, on line 41 the system recognizes the temperature of 800° F. and via line 43, beyond switch 42, sets a target for the steam generator controller to achieve such temperature. Depending upon where actual steam temperature is under the control system 50, the set point of line 43 will affect line FL1, FL2 or ATL and cause the boiler to output steam at such temperature, as otherwise generally known. The target established from line 35 onto line 43 by switch 42 being in excess by 30° F. of the actual rotor temperature value derived on line 4. Once 800° F. steam temperature has been established, the turbine is accelerated and synchronized. No soaking period is necessary. After synchronization (breaker closed) switch 42 transfers to the N position. Steam temperature then ramps at 7¼° F. per minute by lines 19 and 43. No soaking period was necessary, and the circuit of function generator 5 did not play any role.

With a warm start, however, the temperature of the LP rotor bore is initally above 200° F., but the HP rotor temperature is less than the minimum of 700° F. which is characteristic of the signal of line 2. Therefore, the high select circuit 36 chooses the signal of line 2. It is assumed that the initial procedure for starting the turbine has been followed by the control system 50 and/or the operator. Now, the soaking period is initiated with a rotor temperature of at least 700° F. and an intermediate speed for the turbine typically of 2500 RPM. Depending upon steam pressure at the outlet of the steam generator, the signal from line 2 onto line 43 will assign a target varying in accordance with the constant enthalpy requirement of the function in circuit 5, e.g., during the soaking period established by the control system.

With a cold start, as earlier stated, steps will be taken to bring steam temperature and turbine rotor temperature within the range for which the signal of line 2 will be operable, namely at 700° F. or more but less than 770° F. After such preliminary steps have been completed, the soaking period is initiated by the control system 50 and the constant enthalpy temperature control mode is maintained by the target temperature assigned on line 43.

That it be a cold start or a warm start with soaking, or a hot start without soaking, after soaking in the two first situations, or when, in the absence of soaking, the target temperature of 830° F. has conditioned the steam output and consequently the rotor temperature, in the third instance, the breaker is closed and the adaptive temperature demand controller ATC is now set by lines 9 and 28 in its ramping mode. Switches 10 and 42 assume their second position (N), as triggered by the command signal of line 9 to switch 10 and the one of line 28 to switch 42. There is a third switch 21 which also has two positions. Positions Y is with input from line 25 and a fast rate setting from ramp rate setter 23. N is with input from line 24 and a slow rate of typically 7¼° F. per minute, establish by ramp rate setter 22. It is desirable that at the moment switch 42 becomes responsive to the signal of line 19 while on its N-position input, a signal be present on line 19 which represents steam temperature $t_{INL}$ actually present in supply line STL.

This present condition is achieved with the ramp circuit RMP extending between the output of switch 10 and the N-input of switch 42. Ramp circuit RMP includes a rate setting section at 15 and a hold section 18. This circuit is active at all time, whatever the position of the switches. When in the soaking mode (position Y), a signal which is at least 730° is applied by lines 8 and 12 to a subtractor 13. The subtrahend is derived from the input line 19 into the N-input of switch 42 and, via line 20 is used as a feedback signal to subtractor 13. When the switches are in the Y position, switch 21 being also in the Y position, a fast rate is applied via line 25 onto line 17 onto section 15, whereby the ramp generated on line 16 and passed through a normally inactive hold section 18 onto line 19 will ramp very fast to a level for which the error between lines 12 and 20 will become zero, at which very short time, the value of the signal of line 12 will have been translated into a signal on line 19 representing at least 730° or the actual steam temperature if it is higher. If, however all the switches go to position N, switch 21 responds to ramp setter 22 and the ramp rate on section 15 becomes dependent upon the standard rate of 7¼° F. per minute established from line 24 over to line 17. At the moment of transfer from position Y to position N, namely when the circuit breaker is closed and the command signal of lines 28, 9 and 26 to switches 42, 10 and 21 so initiate, the signal of line 19 is passed to line 43. At that moment the signal of line 19 represents the level of the steam temperature of line 3 and the set point of 730° at 7. When transfer occurs, switch 10 takes position N and the target temperature becomes the value 952° F. set from line 39. Nevertheless, such target is reached through the 7¼° F. per minute temperature ramp established at 15. As illustrated in the aforestated hot, warm and cold steps procedures, the ATC circuit effectuates such ramping in temperature, while the control system effectuates ramping in pressure from 300 psi to 1222 psi, load control taking altogether 31 minutes. In other words, during that time the target prescribed by line 43 for the temperature controller of the steam generator will be ramping until 952° F. The present invention also provides for the prevention of undue stresses while controlling temperature increase at a selected rate, when stress calculations made independently, such as according to U.S. Pat. No. 3,446,224 (Zwicky) or U.S. Pat. No. 3,928,972 (Osborne) for instance, indicate that the limit has been reached. To this effect, a command signal, derived in accordance with the Zwicky patent, or the Osborne patent limit stress determination, is applied on line 27 to hold circuit 18. Therefore, when hold circuit 18 is triggered by line 27, the ramp signal of line 19 is held at the level reached so far. This is a precautionary measure overriding the programmed increase of target temperature on line 43 when a critical level of stress has been reached on the turbine.

It is observed that the target temperature set point established by line 43 appears on line 109' on FIG. 5 of the attemperator control section described in the incorporated by reference and concurrently filed copending application Ser. No. 664,644.

We claim:

1. In a combined-cycle steam turbine power generating plant including a heat recovery steam generator for outputting steam at an instantaneous temperature and pressure, and a steam turbine having rotor expanding steam therethrough from said steam generator; means providing a signal representative of the temperature of the rotor of the turbine; and means for controlling the generation of steam by said steam generator to control the temperature of steam in accordance with a predetermined temperature gradient, the combination of:

function generator means responsive to a signal representative of steam turbine throttle pressure for providing a throttle pressure related steam limit temperature according to a constant enthalpy characteristic;

bias means responsive to said rotor temperature representative signal for providing a bias signal in excess of said rotor temperature signal by a predetermined amount;

means responsive to the larger of said limit temperature signal and said bias signal for controlling the generation of steam by said steam generator to control the temperature of steam to iteratively raise the temperature of the rotor in accordance with said constant enthalpy characteristic and said bias signal during soaking.

2. The plant of claim 1, with ramping means operative after termination of soaking and when the plant breaker is closed for providing for said steam generation controlling means a predetermined maximum temperature and for establishing said temperature gradient thereto; said limit temperature signal and bias signal responsive means being disabled.

* * * * *